(12) United States Patent
Ten Eyck et al.

(10) Patent No.: US 8,182,752 B2
(45) Date of Patent: *May 22, 2012

(54) EXHAUST GAS TREATMENT DEVICE

(75) Inventors: John D. Ten Eyck, Lewiston, NY (US); Amit Kumar, Getzville, NY (US)

(73) Assignee: Unifrax I LLC, Niagara Falls, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/017,882

(22) Filed: Jan. 31, 2011

(65) Prior Publication Data

US 2011/0123417 A1    May 26, 2011

Related U.S. Application Data

(60) Continuation of application No. 12/396,087, filed on Mar. 2, 2009, now Pat. No. 7,998,422, which is a division of application No. 11/170,502, filed on Jun. 29, 2005, now Pat. No. 7,971,357.

(60) Provisional application No. 60/583,800, filed on Jun. 29, 2004.

(51) Int. Cl.
 *B01D 50/00* (2006.01)
(52) U.S. Cl. ...................................... 422/179
(58) Field of Classification Search .................. 422/177, 422/179, 180
See application file for complete search history.

(56) References Cited

U.S. PATENT DOCUMENTS

| | | | |
|---|---|---|---|
| 2,624,658 A | 1/1953 | Parker et al. |
| 3,224,927 A | 12/1965 | Brown et al. |
| 3,227,241 A | 1/1966 | Mattoon |
| 3,458,329 A | 7/1969 | Owens et al. |
| 3,649,406 A | 3/1972 | McNish |
| 3,771,967 A | 11/1973 | Nowak |
| 3,795,524 A | 3/1974 | Sowman |
| 3,798,006 A | 3/1974 | Balluff |
| 3,861,881 A | 1/1975 | Nowak |
| 3,876,384 A | 4/1975 | Santiago et al. |
| 3,891,396 A | 6/1975 | Musall et al. |
| 3,916,057 A | 10/1975 | Hatch et al. |
| 3,996,145 A | 12/1976 | Hepburn |
| 4,048,363 A | 9/1977 | Langer et al. |

(Continued)

FOREIGN PATENT DOCUMENTS

CA        1037973       9/1978

(Continued)

OTHER PUBLICATIONS

English translation of Communication from the Japanese Patent Office dispatched on Jul. 12, 2010 for the counterpart Japanese patent application to U.S. Appl. No. 12/396,087.

(Continued)

*Primary Examiner* — Tom Duong
(74) *Attorney, Agent, or Firm* — Curatolo Sidoti Co., LPA; Joseph G. Curatolo; Vincent A. Cortese (57) ABSTRACT

A device for treatment of exhaust gases includes a housing, a fragile structure resiliently mounted within the housing, and a non-intumescent mounting mat disposed in a gap between the housing and the fragile structure. The mounting mat includes a plurality of inorganic fibers that have undergone a surface treatment to increase the holding force performance of the mounting mat. Also disclosed are methods of making a mounting mat for an exhaust gas treatment device and for making an exhaust gas treatment device incorporating the mounting mat.

10 Claims, 3 Drawing Sheets

U.S. PATENT DOCUMENTS

| | | |
|---|---|---|
| 4,087,039 A | 5/1978 | Balluff |
| 4,093,423 A | 6/1978 | Neumann |
| 4,101,280 A | 7/1978 | Frietzsche et al. |
| 4,142,864 A | 3/1979 | Rosynsky et al. |
| 4,156,533 A | 5/1979 | Close et al. |
| 4,159,205 A | 6/1979 | Miyahara et al. |
| 4,204,907 A | 5/1980 | Korklan et al. |
| 4,220,559 A | 9/1980 | Polinski |
| 4,239,733 A | 12/1980 | Foster et al. |
| 4,256,700 A | 3/1981 | Smith et al. |
| 4,269,807 A | 5/1981 | Bailey et al. |
| 4,271,228 A | 6/1981 | Foster et al. |
| 4,277,269 A | 7/1981 | Sweeting |
| 4,279,864 A | 7/1981 | Nara et al. |
| 4,305,992 A | 12/1981 | Langer et al. |
| 4,327,145 A | 4/1982 | Mitani et al. |
| 4,328,187 A | 5/1982 | Musall et al. |
| 4,332,852 A | 6/1982 | Korklan et al. |
| 4,335,077 A | 6/1982 | Santiago et al. |
| 4,344,921 A | 8/1982 | Santiago et al. |
| 4,353,872 A | 10/1982 | Midorikawa |
| 4,385,135 A | 5/1983 | Langer et al. |
| 4,425,304 A | 1/1984 | Kawata et al. |
| 4,432,943 A | 2/1984 | Musall et al. |
| 4,559,862 A | 12/1985 | Case et al. |
| 4,617,176 A | 10/1986 | Merry |
| 4,693,338 A | 9/1987 | Clerc |
| 4,735,757 A | 4/1988 | Yamamoto et al. |
| 4,746,570 A | 5/1988 | Suzaki et al. |
| 4,748,121 A | 5/1988 | Beaver et al. |
| 4,752,515 A | 6/1988 | Hosoi et al. |
| 4,797,263 A | 1/1989 | Oza |
| 4,863,700 A | 9/1989 | Ten Eyck |
| 4,865,818 A | 9/1989 | Merry et al. |
| 4,927,608 A | 5/1990 | Wörner et al. |
| 4,929,429 A | 5/1990 | Merry |
| 4,985,212 A | 1/1991 | Kawakami et al. |
| 4,999,168 A | 3/1991 | Ten Eyck |
| 5,008,086 A | 4/1991 | Merry |
| 5,028,397 A | 7/1991 | Merry |
| 5,032,441 A | 7/1991 | Ten Eyck et al. |
| 5,073,432 A | 12/1991 | Horikawa et al. |
| 5,079,280 A | 1/1992 | Yang et al. |
| 5,094,073 A | 3/1992 | Wörner et al. |
| 5,094,074 A | 3/1992 | Nishizawa et al. |
| 5,110,413 A | 5/1992 | Steer |
| 5,119,551 A | 6/1992 | Abbott |
| 5,132,061 A | 7/1992 | Lindeman et al. |
| 5,145,811 A | 9/1992 | Lintz et al. |
| 5,151,253 A | 9/1992 | Merry et al. |
| 5,242,871 A | 9/1993 | Hashimoto et al. |
| 5,250,269 A | 10/1993 | Langer |
| 5,254,410 A | 10/1993 | Langer et al. |
| 5,258,216 A | 11/1993 | Von Bonin et al. |
| 5,290,522 A | 3/1994 | Rogers et al. |
| 5,326,633 A | 7/1994 | Clough et al. |
| 5,332,609 A | 7/1994 | Corn |
| 5,340,643 A | 8/1994 | Ou et al. |
| 5,376,341 A | 12/1994 | Gulati |
| 5,380,580 A | 1/1995 | Rogers et al. |
| 5,384,188 A | 1/1995 | Lebold et al. |
| 5,389,716 A | 2/1995 | Graves |
| 5,453,116 A | 9/1995 | Fischer et al. |
| 5,482,686 A | 1/1996 | Lebold et al. |
| 5,488,826 A | 2/1996 | Paas |
| 5,523,059 A | 6/1996 | Langer |
| 5,580,532 A | 12/1996 | Robinson et al. |
| 5,585,312 A | 12/1996 | Ten Eyck et al. |
| 5,666,726 A | 9/1997 | Robinson et al. |
| 5,686,039 A | 11/1997 | Merry |
| 5,736,109 A | 4/1998 | Howorth et al. |
| 5,811,063 A | 9/1998 | Robinson et al. |
| 5,853,675 A | 12/1998 | Howorth |
| 5,862,590 A | 1/1999 | Sakashita et al. |
| 5,869,010 A | 2/1999 | Langer |
| 5,882,608 A | 3/1999 | Sanocki et al. |
| 5,955,177 A | 9/1999 | Sanocki et al. |
| 6,000,131 A | 12/1999 | Schmitt |
| 6,051,193 A | 4/2000 | Langer et al. |
| 6,101,714 A | 8/2000 | Schmitt |
| 6,158,120 A | 12/2000 | Foster et al. |
| 6,162,404 A | 12/2000 | Tojo et al. |
| 6,183,852 B1 | 2/2001 | Rorabaugh et al. |
| 6,224,835 B1 | 5/2001 | Langer |
| 6,231,818 B1 | 5/2001 | Ten Eyck |
| 6,245,301 B1 | 6/2001 | Stroom et al. |
| 6,317,976 B1 | 11/2001 | Aranda et al. |
| 6,365,267 B1 | 4/2002 | Langer et al. |
| 6,417,125 B1 | 7/2002 | Rorabaugh et al. |
| 6,458,418 B2 | 10/2002 | Langer et al. |
| 6,468,932 B1 | 10/2002 | Robin et al. |
| 6,589,488 B1 | 7/2003 | Eyhorn |
| 6,613,294 B2 | 9/2003 | Sanocki et al. |
| 6,726,884 B1 | 4/2004 | Dillon et al. |
| 6,737,146 B2 | 5/2004 | Schierz et al. |
| 6,756,107 B1 | 6/2004 | Schierz et al. |
| 6,855,298 B2 | 2/2005 | Ten Eyck |
| 6,923,942 B1 | 8/2005 | Shirk et al. |
| 6,967,006 B1 | 11/2005 | Wirth et al. |
| 7,033,412 B2 | 4/2006 | Kumar et al. |
| 7,261,864 B2 | 8/2007 | Watanabe |
| 7,550,118 B2 | 6/2009 | Merry |
| 2002/0127154 A1 | 9/2002 | Foster et al. |
| 2003/0049180 A1 | 3/2003 | Fukushima |
| 2003/0185724 A1 | 10/2003 | Anji et al. |
| 2004/0052694 A1 | 3/2004 | Nishikawa et al. |
| 2004/0234436 A1 | 11/2004 | Howorth |
| 2006/0153746 A1 | 7/2006 | Merry et al. |
| 2007/0065349 A1 | 3/2007 | Merry |
| 2010/0247399 A1 | 9/2010 | Shirk et al. |

FOREIGN PATENT DOCUMENTS

| | | |
|---|---|---|
| DE | 196 38 542 A1 | 3/1997 |
| EP | 0 205 704 A1 | 12/1986 |
| EP | 0 319 299 A2 | 6/1989 |
| EP | 0 508 751 A1 | 10/1992 |
| EP | 0 551 532 A1 | 7/1993 |
| EP | 0 639 701 A1 | 2/1995 |
| EP | 0 639 702 A1 | 2/1995 |
| EP | 0 643 204 A2 | 3/1995 |
| EP | 0 765 993 A1 | 4/1997 |
| EP | 0 803 643 A1 | 10/1997 |
| EP | 0 973 697 B1 | 5/1998 |
| EP | 0 973 697 | 1/2000 |
| EP | 1 348 679 A2 | 10/2003 |
| GB | 1 438 762 | 6/1976 |
| GB | 1 481 133 | 7/1977 |
| GB | 1 513 808 | 6/1978 |
| GB | 2 200 129 A | 7/1988 |
| JP | 61-141645 A | 6/1986 |
| JP | 1-240715 A | 9/1989 |
| JP | 4-83773 A | 3/1992 |
| JP | 6-272549 A | 9/1994 |
| JP | 7-286514 | 10/1995 |
| JP | 2001-207394 A | 8/2001 |
| JP | 2002-506166 | 2/2002 |
| JP | 2002-514280 | 5/2002 |
| JP | 2002-206421 A | 7/2002 |
| JP | 2002-531720 | 9/2002 |
| WO | WO 91/11498 A1 | 8/1991 |
| WO | WO 97/32118 A1 | 9/1997 |
| WO | WO 99/23370 A1 | 5/1999 |
| WO | WO 99/46028 | 9/1999 |
| WO | WO 00/75496 A1 | 4/2000 |
| WO | WO 01/65008 A1 | 9/2001 |
| WO | WO 01/83956 A1 | 11/2001 |
| WO | WO 02/33233 A1 | 4/2002 |
| WO | WO 02/053511 A1 | 7/2002 |
| WO | WO 03/000414 A1 | 1/2003 |
| WO | WO 03/031368 A2 | 4/2003 |
| WO | WO 2004/031544 A2 | 4/2004 |

OTHER PUBLICATIONS

English translation of Communication from the Japanese Patent Office dispatched on Jan. 24, 2011 for the counterpart Japanese patent application to U.S. Appl. No. 12/396,087.

English translation of Communication from the Japanese Patent Office dispatched on Oct. 31, 2011 for the counterpart Japanese patent application to U.S. Appl. No. 12/396,087.
English language abstract of EP 0803643 B1; Publication Date: Oct. 29, 1997; Applicant: Leistritz AG & Co.
English language abstract of DE 19858025; Publication Date: Jun. 21, 2000; Applicant: Aslgawo GmbH.
Gulati, Ten Eyck & Lebold. Durable Packaging Design for Cordierite Ceramic Catalysts for Motorcycle Application, Mar. 1, 1993. Society of Automotive Engineers Meeting, Detroit MI.
Maret, Gulati, Lambert & Zink. System Durability of a Ceramic Racetrack Converter. Oct. 1991, International Fuels and Lubricants Meeting, Toronto, Canada.
United States Application Publication No. 2001/0036427 A1, Nov. 1, 2001, Yamada et al.
United States Application Publication No. 2002/0025750 A1, Feb. 28, 2002, Dinwoodle.
United States Application Publication No. 2002/0025904 A1, Feb. 28, 2002, Goto et al.
United States Application Publication No. 2003/0165638 A1, Sep. 4, 2003, Louks et al.
United States Application Publication No. 2001/0024626 A1, Sep. 27, 2001, Ten Eyck.
United States Application Publication No. 2004/0134172 A1, Jul. 15, 2004, Kumar et al.
United States U.S. Appl. No. 09/560,469, filed Apr. 28, 2000, entitled "Support Element for Fragile Structures Such as Catalytic Converters."
English translation of Communication from the Japanese Patent Office mailed Nov. 9, 2009 for the counterpart Japanese patent application to U.S. Appl. No. 12/396,087.
English language abstract of JP61-141645; Publication Date Jun. 28, 1986; Applicant: PPG Industries Inc.
English language abstract of JP1-240715; Publication Date Sep. 26, 1989; Applicant: Minnesota Mining & Manufacturing Co.
English language abstract of JP6272549 A; Publication Date Sep. 27, 1994; Applicant: Asahi Glass Co., Ltd.
English language abstract of JP2002-506166; Publication Date Feb. 22, 2002; Applicant: Unifrax Corporation.
English language abstract of JP2002-514280; Publication Date May 14, 2002; Applicant: 3M Innovative Properties Co.
English language abstract of JP 2002-531720; Publication Date Sep. 24, 2002; Applicant: Unifrax Corporation.
Supplementary European Search Report, Form 150303.82, for European Patent Application No. 03 759 486.8, mailing date Jun. 18, 2010.
International Search Report, Form PCT/ISA/210, and Written Opinion, Form PCT/ISA/237 for PCT International Patent Application No. PCT/US2005/023408.
International Preliminary Report on Patentability, Form PCT/IPEA/416, for PCT International Patent Application No. PCT/US2005/023408.
Tosa Shin'ichi, et al., "The Development of Converter Canning Technology for Thin Wall Substrate." Honda R&D Tech. Rev., vol. 12, No. 1, pp. 175-182, Japan (2000).
Product Brochure—"There's More to it Than You Think. HDK—Pyrogenic Silica", Wacker Silicones, 6173/10.05/e, Oct. 2005.
Technical Data Sheet—"HDK N20 Pyrogenic Silica", Wacker Silicones, Version 1.0, Jun. 12, 2008.
Office Action from the United States Patent and Trademark Office for corresponding U.S. Appl. No. 11/170,502 mailed on Apr. 6, 2011.
Office Action from the United States Patent and Trademark Office for corresponding U.S. Appl. No. 11/170,502 mailed on Oct. 26, 2010.
Office Action from the United States Patent and Trademark Office for corresponding U.S. Appl. No. 11/170,502 mailed on Dec. 8, 2009.
Office Action from the United States Patent and Trademark Office for corresponding U.S. Appl. No. 11/170,502 mailed on May 27, 2009.
Office Action from the United States Patent and Trademark Office for corresponding U.S. Appl. No. 11/170,502 mailed on Mar. 23, 2009.
Office Action from the United States Patent and Trademark Office for corresponding U.S. Appl. No. 12/396,087 mailed on Feb. 11, 2011.

EXHAUST GAS TREATMENT DEVICE

CROSS REFERENCE TO RELATED APPLICATIONS

This application is a continuation application of co-pending U.S. Ser. No. 12/396,087 filed on Mar. 2, 2009 which is a divisional of co-pending U.S. Ser. No. 11/170,502, filed Jun. 29, 2005, both of which claim the benefit of the filing date under 35 U.S.C. §119(e) of U.S. Provisional Application Ser. No. 60/583,800 filed on Jun. 29, 2004, and all of which are hereby incorporated by reference in their entireties.

BACKGROUND

A device for the treatment of exhaust gases is provided, such as a catalytic converter or a diesel particulate trap having a fragile structure mounted within a housing which is supported therein by a mounting mat disposed between the housing and the fragile structure.

A catalytic converter assembly for treating exhaust gases of an automotive or diesel engine contains a fragile structure, such as a catalyst support structure, for holding the catalyst that is used to effect the oxidation of carbon monoxide and hydrocarbons and the reduction of oxides of nitrogen present in the exhaust gases. The fragile catalyst support structure is mounted within a metal housing, and is preferably made of a frangible material, such as a monolithic structure formed of metal or a brittle, fireproof ceramic material such as aluminum oxide, silicon dioxide, magnesium oxide, zirconia, cordierite, silicon carbide and the like. These materials provide a skeleton type of structure with a plurality of tiny flow channels. However, as noted hereinabove, these structures can be, and oftentimes are, very fragile. In fact, these monolithic structures can be so fragile that small shockloads or stresses are often sufficient to crack or crush them.

The fragile structure is contained within a metal housing, with a space or gap between the external surface of the fragile structure and the internal surface of the housing. In order to protect the fragile structure from thermal and mechanical shock and other stresses noted above, as well as to provide thermal insulation and a gas seal, and to hold the fragile catalyst support structure in place within the housing, it is known to position at least one ply or layer of mounting or support material within the gap between the fragile structure and the housing.

Presently, materials used in mounting mats for catalytic converters and other to exhaust gas-treating devices may range from relatively inexpensive materials such as, for example, amorphous glass fibers such as S-glass, to more expensive materials such as, for example, high alumina-containing ceramic oxide fibers. Intumescent materials as well as non-intumescent materials have been and continue to be employed in mounting mats, depending upon the application and conditions under which the mounting mats are to be used.

The type of monolithic structure to be employed as well as the application and the conditions under which the mounting mats are to be used must be determined prior to selection of the mounting mat materials. For example, one would use a high temperature resistant mounting mat material adaptable over a wide temperature range for a high temperature application such as typically found in catalytic converters, while a lower temperature resistant, resilient, flexible material may be just as or more suitable for high G load applications that use heavier substrates such as may be found in diesel catalyst structures and diesel particulate traps.

In any event, the mounting mat materials employed should be capable of satisfying any of a number of design or physical requirements set forth by the fragile structure manufacturers or the catalytic converter manufacturers. For example, a state-of-the-art ply or plies of mounting mat material, should preferably exert an effective residual holding pressure on the fragile structure, even when the catalytic converter has undergone wide temperature fluctuations, which causes significant expansion and contraction of the metal housing in relation to the fragile structure, also referred to as the catalyst support structure, which in turn causes significant compression and release cycles for the mounting mats over a period of time. The best, state-of-the-art mounting mats used in high temperature applications have been found to sufficiently hold the fragile structure in the most severe of applications where temperatures reach well above 900° C., and often undergo constant thermal cycling to room temperature.

Other mounting mats, while not requiring use in high temperature environments, must provide sufficient resiliency and flexibility to effectively hold the fragile structure with sufficient force or strength, but yet not crush the fragile structure under constant thermal cycling. Under normal operating conditions for a catalytic converter, a minimum shear strength for a mounting mat of at least 5 kPa is required to prevent the fragile structure from being dislodged and damaged. The shear strength of the mat is defined as the mat's holding pressure multiplied by the coefficient of friction of the mat/fragile structure interface. The coefficient of friction of typical mat products in catalytic converters is approximately 0.45 in the in-use condition. Therefore, a mounting mat for high temperature applications, i.e., those applications where the temperature in the catalytic converter may increase up to about 900° C. or more, should have an effective residual minimum holding pressure after 1000 cycles of testing at a hot face temperature of about 900° C. of at least about 10 kPa.

For other exhaust gas-treating devices, such as diesel particulate traps or diesel catalyst structures, it will be appreciated that while these devices do not reach the temperatures provided in high temperature catalytic converters, the weight of the fragile structure and loading techniques employed require the mounting mat utilized to have a different effective residual minimum holding pressure than that set forth above. In these applications, a higher minimum shear strength for the mounting mat of at least about 25 kPa is preferably achieved to prevent that fragile structure from being dislodged and damaged. The coefficient of friction of these mat products in such high G-load applications with heavy substrates is still approximately 0.45 in the in-use condition. Therefore, a mounting mat for this type of application should have an effective residual minimum holding pressure after 1000 cycles of testing at a temperature of about 300° C. of at least about 50 kPa.

Many mounting mats, heretofore, have attempted to overcome thermal cycling problems associated with high temperature applications by using high alumina or mullite ceramic fibers. In one known embodiment, an aqueous solution or a colloidal dispersion, often called an "organosol" or a "sol gel" is used to produce the ceramic fibers. While ceramic fibers formed by sol gel processes may offer a high degree of resiliency needed for mounting monolithic structures, the high cost of the fibers have forced manufacturers to seek other, less expensive solutions. In addition, these ceramic fibers typically have an average fiber diameter of less than 5, and in some cases, less than 3.5, microns. Thus, these fibers are respirable, i.e., capable of being breathed into the lungs.

In other instances, a fibrous mounting material may be used in combination with other materials, such as intumescent materials and backing layers, in order to provide sufficient strength for handleability, resiliency, or to obtain an adequate holding pressure.

As another alternative to using sol gel-derived, ceramic fibers, attempts have been made to form refractory ceramic fibers using melt-processing techniques. Only in the last ten years or so have refractory ceramic fibers, i.e., fibers containing from about 45 to 60 percent alumina and from about 40 to about 55 percent silica, satisfied manufacturers of high temperature catalytic converters by providing mounting mats having sufficient resiliency values to meet the manufacturers' demands. Not only are mounting mats containing such refractory ceramic fibers expensive, but also they are difficult to manufacture, particularly with respect to the processing treatments they must undergo. Care must be taken to ensure that they are substantially shot free.

In low temperature catalytic converter applications, such as turbocharged direct injection (TDI) diesel powered vehicles, the exhaust temperature is typically about 150° C. and may never exceed 300° C. Various types of mounting mats may be used for these and other slightly higher temperature applications. For many catalytic converter applications, intumescent mats, i.e., mounting mats made from intumescent materials such as graphite or vermiculite, have been used. It has more recently been observed that mounting mats made with intumescent materials may fail for these low temperature applications.

One possible reason for this failure is that the exhaust temperature may be too low to expand the intumescent, typically vermiculite, particles sufficiently. Thus, the mats fail to provide sufficient pressure against the fragile structure and tend to fail. A second possible reason for this failure is that organic binder systems used in the intumescent mat products degrade and cause a loss in the holding pressure.

Thus, non-intumescent mounting mat systems have been developed and are now common within the industry. These materials are suitable for use over a much wider temperature range than are the intumescent prior art mats.

Non-intumescent mat systems include substantially no intumescent materials such as graphite or vermiculite and, therefore, are substantially non-expanding. By "substantially non-expanding," it is meant that the mat does not readily expand upon the application of heat as would be expected with intumescent mats. Of course, some expansion of the mat does occur based upon its thermal coefficient of expansion, but the amount of expansion is insubstantial and de minimus as compared to the expansion of mats employing useful amounts of intumescent material. These non-intumescent mats, heretofore, have comprised high temperature resistant, inorganic fibers and, optionally, a binder. By high temperature resistant, it is meant that the fiber can have a use temperature up to about 900° C. or greater. Depending upon the application, the temperature regime in which the mat is used, and the type of monolith employed, non-intumescent mats have, heretofore, been known to generally contain one or more types of fibers selected from alumina/silica fibers (available under the trademark FIBERFRAX from Unifrax Corporation, Niagara Falls, N.Y.) and high alumina fiber mats available from Saffil.

Presently, fibers employed in state-of-the-art non-intumescent mounting mats for higher temperature applications are generally high in alumina content. For example, refractory ceramic fibers are composed substantially of alumina and silica and typically contain from about 45 to about 60 percent by weight alumina and from about 40 to about 55 percent by weight silica, while other alumina/silica ceramic fibers, such as alumina or mullite ceramic fibers made by sol gel processing, usually contain more than 50 percent alumina. S2-glass fibers typically contain from about 64 to about 66 percent silica, from about 24 to about 25 percent alumina, and from about 9 to about 10 percent magnesia. Generally, it has been thought that the higher the amount of alumina employed in the fibers, the higher temperature for the application in which the fibers could be employed. The use of fibers consisting substantially of alumina have therefore been proposed for this purpose.

Other non-intumescent mounting mats are generally very thick and lack the structural integrity needed for the exhaust gas treatment device application, and may even require being handled in a bag to prevent crumbling of the mounting mat. These mounting mats are also difficult to cut to size for installation, and further must be compressed substantially to fit enough material needed for supportive mounting within the gap between the catalyst support structure and the housing.

Attempts have been made to use still other types of materials in the production of non-intumescent mounting mats for catalytic converters and other exhaust gas-treating devices for high temperature applications, such as flexible, nonwoven mounting mats comprising shot-free ceramic oxide fibers comprising aluminosilicate fibers containing from about 60 to about 85 percent by weight alumina and from about 40 to about 15 percent by weight silica; crystalline quartz fibers; or both. These aluminosilicate fibers have a higher alumina content than refractory ceramic fibers, but are produced using the sol gel techniques discussed above.

On the other hand, crystalline quartz fibers are made of essentially pure silica (i.e., 99.9 percent silica). These fibers are made by a melt drawing process using raw materials derived from crystalline quartz, and are not leached in any manner. Such fibers are available from J. P. Stevens, Slater, N.Y., under the tradename ASTROQUARTZ, or from Saint Gobain, Louisville, Ky., under the tradename QUARTZEL. However, the cost of these quartz fibers make them commercially prohibitive for use in mounting mats.

Similarly, U.S. Pat. No. 5,290,522 discloses a nonwoven mounting mat for a catalytic converter that may contain magnesia/alumina/silicate fibers such as is known in the art and commercially available from Owens Corning, Toledo, Ohio as S2-GLASS, as well as the ASTROQUARTZ quartz fibers discussed in the above cited patent. In this patent, it is expressly noted in Comparative Example 1 that a mounting mat containing a commercially available leached glass fiber containing silica did not pass the hot shake test used by the patentees to determine suitability as a mounting mat for higher temperature catalytic converters.

Mounting mats containing silica fibers in combination with intumescent materials have been tested for catalytic converter use, for example in German Patent Publication No. 19858025.

A detailed description and process for making leached glass fibers high in silica content is contained in U.S. Pat. No. 2,624,658, the entire disclosure of which is incorporated herein by reference. Another process for making leached glass fibers high in silica content is disclosed in European Patent Application Publication No. 0973697. While both the U.S. patent and the European patent application publication disclose the production of leached silica fibers in the formation of high temperature resistant products made from the resultant fibers, there is no mention whatsoever of the fibers being suitable for use or even being capable of being used as mounting mats for exhaust gas treatment devices, such as catalytic converters.

SUMMARY

Broadly, continuous inorganic fibers having undergone a surface treatment are used to form a substantially non-expanding mounting mats for catalytic converters and other exhaust gas-treating devices. In certain embodiments, melt-formed, leached glass fibers high in silica content having undergone a surface treatment are used to form non-intumescent mounting mats for catalytic converters and other exhaust gas-treating devices.

In other certain embodiments, the leached and surface treated glass fibers containing silica or the mounting mats comprising them may be heat treated prior to being disposed within a catalytic converter to further increase the holding pressure performance of the mounting mats.

A device for treatment of exhaust gases is provided comprising a housing; a fragile structure resiliently mounted within said housing; and a substantially non-expanding mounting mat disposed in a gap between said housing and said fragile structure, wherein said mounting mat includes inorganic fibers having a holding pressure performance increasing surface treatment thereon.

According to certain embodiments, the device for treatment of exhaust gases comprises a housing, a fragile structure resiliently mounted within said housing, and a substantially non-expanding mounting mat disposed in a gap between said housing and said fragile structure, wherein said mounting mat includes melt-formed, leached glass fibers containing at least 67 percent by weight silica, and wherein at least a portion of the exterior surfaces of said leached glass fibers have the holding pressure performance increasing surface treatment thereon.

A method of making a device for treating exhaust gases is also provided, the method comprises providing a mounting mat comprising inorganic fibers having a holding pressure performance increasing surface treatment thereon, wrapping the mounting mat around at least a portion of a fragile structure adapted for treating exhaust gases, and disposing the fragile structure and the mounting mat within a housing, whereby the mounting mat holds the fragile structure resiliently within the housing.

According to other embodiments of the method of making a device for treating exhaust gases, the method comprises providing a mounting mat comprising melt-formed glass fibers containing silica, wherein the melt-formed glass fibers are formed by treating the melt-formed glass fibers to have a silica content greater than the silica content of the glass fibers prior to being treated and whereby the treated glass fibers contain at least 67 percent by weight silica, treating the exterior surfaces of at least a portion of said treated glass fibers, wrapping the mounting mat around at least a portion of a fragile structure adapted for treating exhaust gases, and disposing the fragile structure and the mounting mat within a housing, whereby the mounting mat holds the fragile structure resiliently within the housing.

A method for making a mounting mat structure for holding a fragile structure within the housing of an exhaust gas treatment device is also provided, the method comprises providing inorganic fibers, applying a holding pressure-increasing surface treatment to at least portions of the exterior surfaces of the inorganic fibers, and incorporating the surface treated inorganic fibers into a mat structure. The mounting mat containing the surface treated inorganic fibers has a greater holding pressure performance for holding a fragile structure within the housing of the exhaust gas treatment device as compared to a mounting mat containing the same inorganic fibers, but without the holding pressure performance increasing surface treatment.

According to other embodiments of the method for making a mat structure containing inorganic fibers, the method comprises applying a holding pressure-increasing surface treatment to the exterior surfaces of leached glass fibers containing at least 67 percent by weight silica, and incorporating the surface treated leached glass fibers into a mat structure.

DETAILED DESCRIPTION

A device for treating exhaust gases is provided having a fragile structure mounted within a housing that is supported therein by a mounting mat disposed between the housing and the fragile structure. It will be understood that the mounting mat is not intended to be limited to use in the catalytic converter shown in FIG. 1, and so the shape is shown only as an illustrative embodiment. In fact, the mounting mat could be used to mount or support any fragile structure suitable for treating exhaust gases, such as a diesel catalyst structure, a diesel particulate trap, or the like. Catalyst structures generally include one or more porous tubular or honeycomb-like structures mounted by a thermally resistant material within a housing. Each structure may include anywhere from about 200 to about 900 or more channels or cells per square inch, depending upon the type of exhaust treating device. A diesel particulate trap differs from a catalyst structure in that each channel or cell within the particulate trap is closed at one end or the other. Particulate is collected from exhaust gases in the porous structure until regenerated by a high temperature burnout process. Non-automotive applications for the mounting mat may include catalytic converters for chemical industry emission (exhaust) stacks. The term "fragile structure" is intended to mean and include structures such as metal or ceramic monoliths or the like which may be fragile or frangible in nature, and would benefit from a mounting mat such as is described herein.

Figure 1:
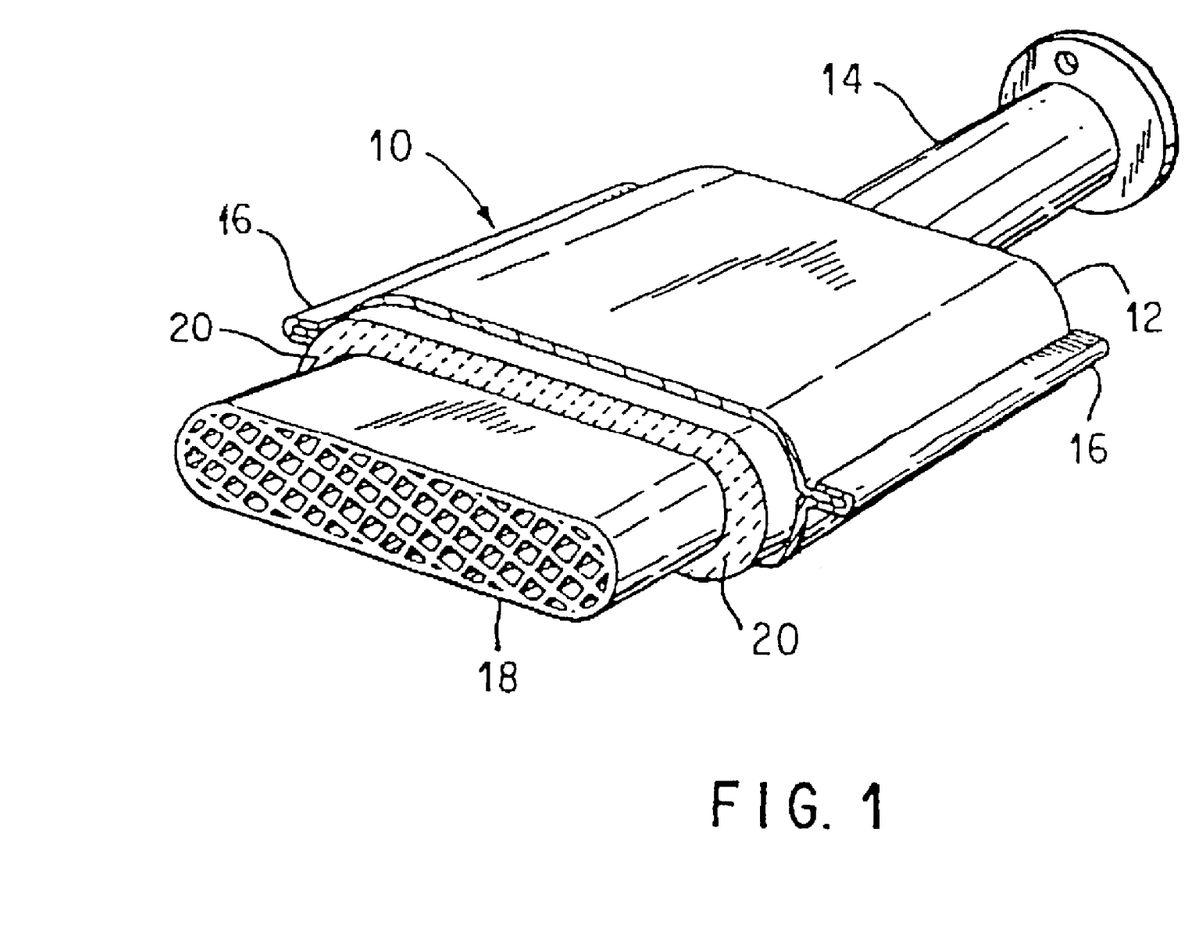
FIG. 1 shows a fragmentary, elevational view of a catalytic converter containing a mounting mat according to the present invention.
Figure 2A:
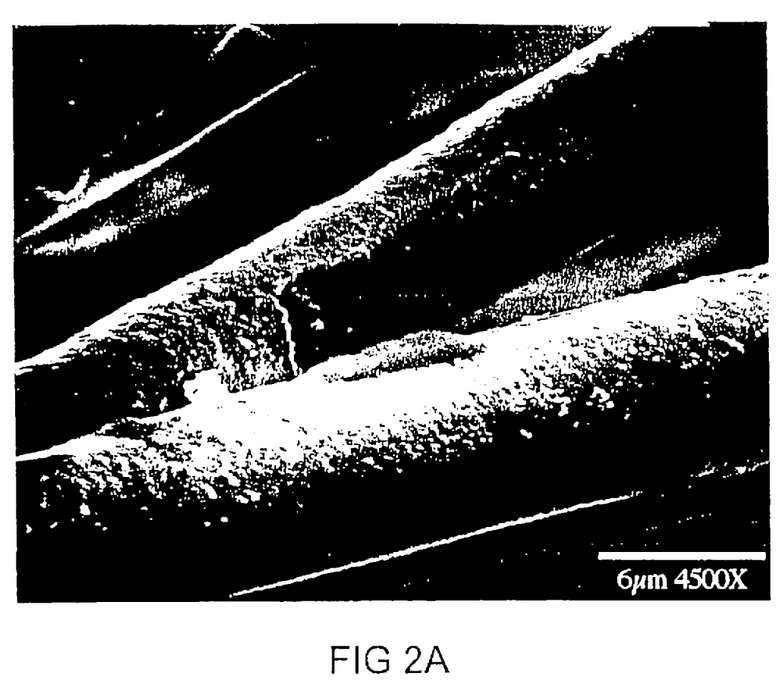
FIGS. 2A-2D are photomicrographs showing inorganic fibers having a surface treatment applied on the exterior surfaces of the fibers.
Figure 2B:
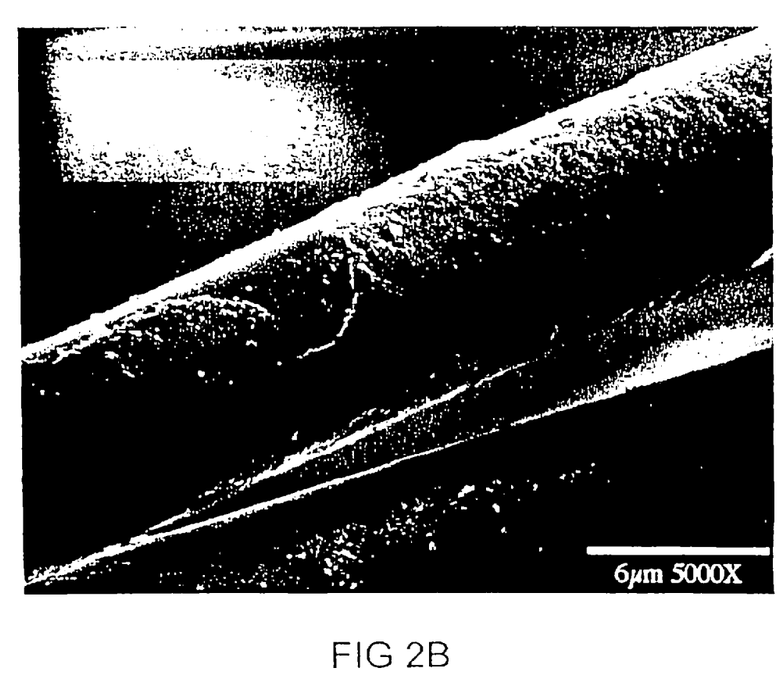
Figure 2C:
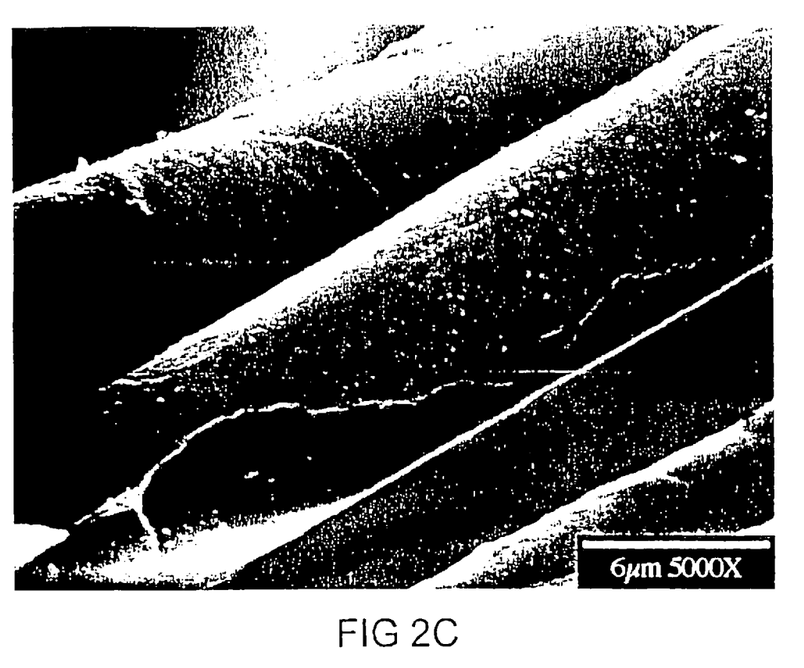
Figure 2D:
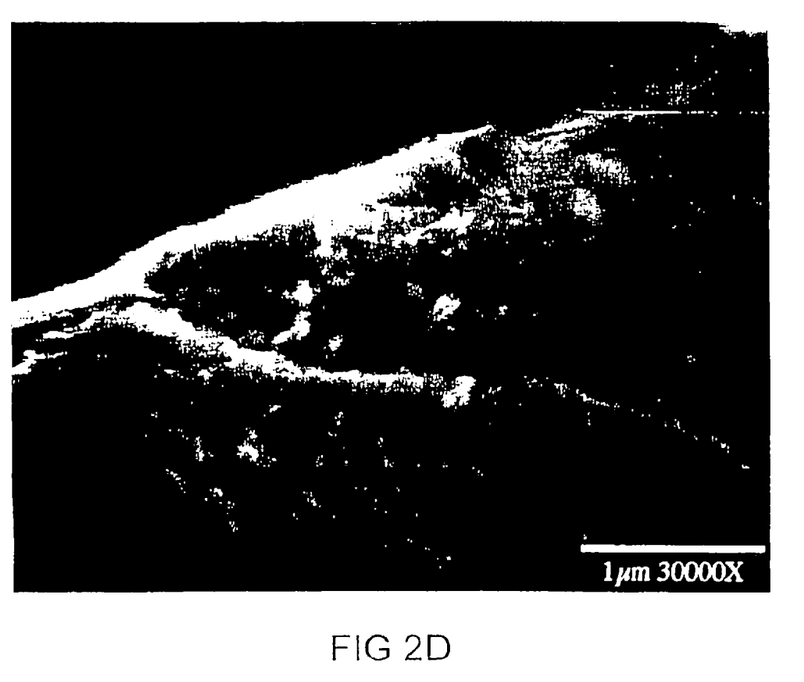

One representative form of a device for treating exhaust gases is shown as a catalytic converter, generally designated by the numeral 10 in FIG. 1. Catalytic converter 10 may include a generally tubular housing 12 formed of two pieces of metal, e.g. high temperature resistant steel, held together by flange 16. Alternatively, the housing may include a preformed canister into which a mounting mat-wrapped catalyst support structure is inserted. Housing 12 includes an inlet 14 at one end and an outlet (not shown) at its opposite end. The inlet 14 and outlet are suitably formed at their outer ends whereby they may be secured to conduits in the exhaust system of an internal combustion engine. Device 10 contains a fragile catalyst support structure, such as a frangible ceramic monolith 18, which is supported and restrained within housing 12 by a mounting mat 20, to be further described. Monolith 18 includes a plurality of gas pervious passages that extend axially from its inlet end surface at one end to its outlet end surface at its opposite end. Monolith 18 may be constructed of any suitable refractory metal or ceramic material in any known manner and configuration.

Monoliths are typically oval or round in cross-sectional configuration, but other shapes are possible.

The monolith is spaced from its housing by a distance or a gap, which will vary according to the type and design of the device utilized, e.g., a catalytic converter, a diesel catalyst structure, or a diesel particulate trap. This gap is filled with a mounting mat 20 to provide resilient support to the ceramic monolith 18. The resilient mounting mat 20 provides both thermal insulation to the external environment and mechanical support to the catalyst support structure, protecting the fragile structure from mechanical shock, across a wide range of exhaust gas treatment device operating temperatures.

In general, the mounting mat includes continuous inorganic fibers having undergone a surface treatment to increase the holding pressure capability of the mounting mat 20 to resiliently hold a fragile structure 18 within a housing 12 of an exhaust gas treatment device 10. Without limitation, a holding pressure performance increasing agent may be applied to at least a portion of the exterior surfaces of the inorganic fibers to improve the holding pressure performance of the mounting mat. Crystalline and polycrystalline inorganic fibers may be utilized in the mounting mats so long as the fibers can withstand the surface treatment process, can withstand the high operating temperatures of the exhaust gas treatment devices, and provide the minimum holding pressure performance for holding fragile monoliths within the catalytic converter housing. Without limitation, suitable inorganic fibers that may be used to prepare the mounting mat and exhaust gas treatment device include alumina fibers, alumino-silicate fibers, alumina/magnesia/silica fibers, calcia/magnesia/silica fibers, magnesia/silica fibers, S-glass fibers, E-glass fibers, quartz fibers, and silica fibers.

In certain embodiments, the mounting mat 20 comprises one or more non-intumescent plies of melt-formed, amorphous, high-temperature resistant leached glass fibers having a high silica content which have undergone a surface treatment to increase the holding pressure performance of the mat. The mounting mat 20 optionally includes a binder or other fibers suitable for acting as a binder. By the term "high silica content," it is meant that the fibers contain more silica than any other compositional ingredient in the fibers. In fact, as discussed below, it will be appreciated that the silica content of these fibers after leaching are preferably greater than any other glass fibers containing silica, including S-glass fibers, except crystalline quartz derived fibers or pure silica fibers.

The mounting mat, exhaust gas treatment device, and processes for making the same will be further described with reference to illustrative embodiments utilizing leached glass fibers containing a high content of silica, and having a surface treatment applied to at least a portion of the exterior surfaces of the high silica containing glass fibers.

The mounting mat is generally an integral, substantially non-expanding composite sheet or sheets of melt-formed, leached glass fibers containing silica that have undergone a surface treatment and optionally minor amounts of alumina and other non-siliceous oxides. By "melt-formed," it is meant that the fibers are created using melt processing techniques and are not formed from sol gel or other chemical dispersion techniques. By "integral," it is meant that, after manufacture and densification, the mounting mat has a self-supporting structure, needing no reinforcing or containment layers of fabric, plastic or paper, (including those which are stitch-bonded to the mat) and can be handled or manipulated without disintegration. By "substantially non-expanding," it is meant that the mounting mat does not readily expand in response to the application of heat as would be expected with mounting mat containing sufficient amounts of intumescent materials. It should be noted that some expansion of the mounting mats does occur in response to the application of heat, based upon the coefficient of thermal expansion, but the amount of expansion is insubstantial as compared to the expansion of mounting mats employing sufficient amounts intumescent materials. Hence, in certain embodiments, it will be appreciated that the mounting mat is devoid of intumescent materials, sol gel-derived glass silica fibers, and/or backing or reinforcing layers.

As noted above, the glass fibers are preferably treated to increase the silica content of the fibers. That is, when first melt processed and formed into fibers such as by melt drawing the fibers, these glass fibers typically include many non-siliceous oxides and other components. That is, they may have the characteristics of fiberglass, for example. They are not initially formed from pure silica fibers like the crystalline quartz derived fibers disclosed in U.S. Pat. Nos. 5,290,522 or 5,380,580. Instead, these "impure" glass fibers must be treated to remove the non-siliceous oxides such as sodium oxide, boron oxide, and any other water or acid soluble components present, thereby producing fibers of high silica content, wherein the silica content is greater than the silica content of the glass fibers prior to being treated. The silica content of a resultant treated glass fiber depends upon the amount of non-siliceous oxides and other components initially present and the degree of extraction of these materials from the fibers.

Leaching is one preferred treatment for the glass fibers that will increase the silica content of the fibers. Glass fibers may be leached in any manner and using any techniques known in the art. Generally, leaching may be accomplished by subjecting the melt formed glass fibers to an acid solution or other solution suitable for extracting the non-siliceous oxides and other components from the fibers. As previously noted, a more detailed description of various known leaching techniques are discussed in U.S. Pat. No. 2,624,658 and European Patent Application Publication No. 0973697, although the leaching techniques that may be used are not limited to them.

The silica purity after leaching these glass fibers is much higher than prior to leaching. Generally, the leached glass fibers will have a silica content of at least 67 percent by weight. This is greater than the silica content of S-glass. According to certain embodiments, the leached glass fibers contain at least 90 percent by weight. In fact, the silica content of the leached glass fibers may be in the range of about 90 percent by weight to about 99 percent by weight silica. It will be appreciated that the high silica content of these fibers is greater than the known purity of any other known glass fibers containing silica, including S-glass fibers, except quartz fibers or pure silica fibers which contain greater than 99.9 percent silica.

In certain embodiments, the glass fibers will contain from about 93 to about 95 percent by weight silica, with the remainder of the fiber being non-siliceous oxides such as alumina, sodium oxide, and oxides of other alkali or alkaline earth metals. Amounts of alumina may preferably range from about 4 to about 6 percent by weight, while other ceramic oxides and components, including sodium oxides, generally comprise less than about 1 percent by weight of the leached glass fiber. The leached glass fibers may contain less than 1 percent by weight alkali or alkaline earth metals. It will be understood that not all of the non-siliceous oxides need be removed from the leached glass fibers. The fibers are also substantially shot free. The leached glass fibers high in silica content generally have 10 weight percent or less shot content. In certain embodiments, the leached glass fibers high in silica content generally have 5 weight percent or less shot content.

These leached glass fibers are relatively inexpensive as compared to ceramic fibers such as high alumina fibers and particularly the above described crystalline quartz derived fibers. The average fiber diameter of these leached glass fibers may be greater than at least about 3.5 microns, and in some instances, may be greater than at least about 5 microns. On average, the glass fibers typically have a diameter of about 9 microns. Suitable leached glass fibers generally may have an average fiber diameter of from about 5 to about 14 microns. Thus, the leached glass fibers used to make the mounting mat of the exhaust gas treatment device are non-respirable.

The leached glass fibers may be provided in any form commonly used in the production of mounting mats. In certain embodiments, these fibers are chopped tow fibers. Prior to leaching, it will be appreciated that the fibers can be produced by any method known in the art, but are typically formed using known melt processing techniques such as either by melt spinning or melt drawing in a manner which will provide a cost effective approach to the production of the fibers. In certain embodiments, the glass fibers are melt drawn.

Examples of leached glass fibers high in silica content and suitable for use in the production of a mounting mat for a catalytic converter or other known gas-treating device include those leached glass fibers available from BelChem Fiber Materials GmbH, Germany, under the trademark BELCOTEX, from Hitco Carbon Composites, Inc. of Gardena Calif., under the registered trademark REFRASIL, and from Polotsk-Steklovolokno, Republic of Belarus, under the designation PS-23(R).

The BELCOTEX fibers are standard type, staple fiber preyarns. These fibers have an average fineness of about 550 tex and are generally made from silicic acid modified by alumina. The BELCOTEX fibers are amorphous and generally contain about 94.5 silica, about 4.5 percent alumina, less than 0.5 percent sodium oxide, and less than 0.5 percent of other components. These fibers have an average fiber diameter of about 9 microns and a melting point in the range of 1500° to 1550° C. These fibers are heat resistant to temperatures of up to 1100° C., and are typically shot free and binder free.

The REFRASIL fibers, like the BELCOTEX fibers, are amorphous leached glass fibers high in silica content for providing thermal insulation for applications in the 1000° to 1100° C. temperature range. These fibers are between about 6 and about 13 microns in diameter, and have a melting point of about 1700° C. The fibers, after leaching, typically have a silica content of about 95 percent by weight. Alumina may be present in an amount of about 4 percent by weight with other components being present in an amount of 1 percent or less.

The PS-23 (R) fibers from Polotsk-Steklovolokno are amorphous glass fibers high in silica content and are suitable for thermal insulation for applications requiring resistance to at least about 1000° C. These fibers have a fiber length in the range of about 5 to about 20 mm and a fiber diameter of about 9 microns. These fibers, like the REFRASIL fibers, have a melting point of about 1700° C.

Leached glass fibers made into mat form have typically been found to provide a mat having inadequate holding pressure. While it may be possible for a mounting mat comprising leached glass fibers containing silica to initially provide an adequate minimum holding pressure for holding a fragile structure within a housing of a catalytic converter, mechanical or thermal cycling of the mat will quickly destroy its ability to maintain that minimum holding pressure. Thus, one would be led away from using leached glass fibers high in silica content in the production of a catalytic converter mounting mat. This fact is confirmed by the failure of the hot shake testing reported in U.S. Pat. No. 5,290,522.

The melt-formed, leached glass fibers high in silica content are subjected to a surface treatment, which results in an increase in the holding pressure performance of a mounting mat containing a plurality of the leached, high silica containing glass fibers. Without being bound to any particular theory, it is believed that the surface treatment applied to the leach glass fibers may result in an increase of the friction of the fiber surfaces. The increase in the friction of the exterior fiber surfaces substantially reduces the amount of slippage between the fibers of the mounting mat itself, between the fibers of the mounting mat and the interior surfaces of the housing of the exhaust gas treatment device, and between the fibers of the mounting mat and the exterior surfaces of the fragile structure that is in contact with the mounting mat.

According to one embodiment, the exterior surfaces of the leached glass fibers may be treated by applying an inorganic particulate material to at least portions of the fiber surfaces. Useful inorganic particulate materials that may be utilized to treat the exterior of the fiber surfaces of the leached glass fibers include, without limitation, colloidal dispersions of alumina, silica, zirconia, and mixtures thereof. According to one embodiment, the inorganic material used to treat the exterior surfaces of the leached glass fibers, thereby increasing the overall holding pressure performance of the mounting mat, is a colloidal dispersion of alumina.

At least a portion of the exterior surfaces of at least a portion of the leached glass fibers of the mounting mat include a continuous or discontinuous coating of colloidal alumina. The colloidal alumina may be applied to the exterior surfaces of the leached glass fibers by any suitable means, without limitation, by coating, dipping, spraying, splashing, and the like. The colloidal alumina may be applied to the exterior surfaces of the leached glass fibers in either a continuous or discontinuous pattern. Moreover, the process of applying the colloidal alumina to the exterior surfaces of the leached glass fibers may be carried out during or after manufacture of the glass fibers.

The mounting mat structure for exhaust gas treatment devices including a plurality of the surface treated glass fibers having a surface treatment of colloidal alumina, colloidal silica, and/or colloidal zirconia is believed to exert a greater frictional force against both the outer surfaces of the fragile monolith structure and the inner surface of the housing of the exhaust gas treatment device. Thus, the mounting mat including the surface treated glass fibers has a higher shear strength for resiliently holding fragile monoliths within the housing of the exhaust gas treatment device.

In certain embodiments, the leached and surface treated glass fibers prior to formation of the mounting mat, or mounting mats made from these fibers after formation, may be heat treated to further improve the holding pressure performance of the mounting mats.

In one particular embodiment, these leached glass fibers (or the mounting mats containing them) may be heat treated at temperatures ranging from above at least about 900° C. It has also been found that heat treating the leached glass fibers high in silica content and having a surface treatment of a colloidal dispersion of inorganic oxides, such as a colloidal dispersion of alumina, at a temperature in the range from about 900° C. to about 1100° C. further improves the holding pressure performance of a mounting mat such that the mounting mat employing these fibers may exert the minimum required holding pressure within the exhaust gas treatment device, even after 1000 cycles of expansion and contraction.

It is believed that heat treating the leached and surface treated high silica glass fibers improves the creep resistance of the fibers. It is also believed that heat treating the fibers removes additional aqueous components out of the fibers. The use of heat treated and surface treated, leached, high silica glass fibers allows for the production of a mounting mat that is suitable for higher temperature applications, well beyond the melting point of fiberglass.

Heat treatment of the leached glass fibers may take place prior to formation of the mounting mat or after formation of the mounting mat. When heat treated after formation of the mounting mat, the mounting mat is heat treated at a temperature of at least about 900° C. for an effective period of time to further improve the minimum holding pressure performance of the mounting mat for holding the fragile structure within the housing for the application. Similarly, when heat treated prior to formation of the mounting mat, the leached and surface treated glass fibers may preferably be heated to a temperature of at least about 900° C. for an effective period of time such that, when formed into the mounting mat, the minimum holding pressure performance for holding the fragile structure within the housing is further improved. The particular amount of time for heat treating may vary widely depending upon, among other things, the thickness of the mat, the uniformity of the heating, type of heating source used, the ramp up time and temperature of the heating source, etc. All of these variables are well understood by those skilled in the art, so an effective period of time for heating at a temperature of at least about 900° C. or above may be readily determined without undue experimentation.

Generally, it has been recognized that heat treatment may take anywhere from 15 minutes or less, where relatively small, thin mats and excellent and uniform heat sources are used, to more than 1 hour where larger, thicker mats are employed (not including temperature ramp up and ramp down time). In certain embodiments, the mounting mat or leached glass fibers are heated at a temperature of between about 900° C. and about 1100° C. for greater than 1 hour. Heat treating under any time and temperature regimen below the time and/or temperature resulting in devitrification of the fibers, to achieve the same beneficial effects outlined above, would fall within the scope of the invention. Generally, the fibers or mat may be heat treated at or above the intended use temperature. It is noted that heat treating at lower temperatures may affect the usefulness of the mounting mat in applications requiring thermal cycling at temperatures substantially above the heat treatment temperature.

According to certain embodiments, leached glass fibers high in silica content and having a surface treatment of colloidal alumina may be heat treated at a temperature from about 900° C. to about 1100° C. for about 2 hours. The resulting mounting mats incorporating a plurality of such fibers possesses the required minimum holding pressure for holding a fragile monolith within the housing of the catalytic converter. As shown in FIGS. 2A-2D, heat treating the leached glass fibers high in silica content and having a surface treatment of colloidal alumina provides a uniform coating (continuous or discontinuous) on the surfaces of the fibers. When viewed by electron microscopy, the surface addition of colloidal alumina is amorphous in nature and does not contain any crystal formations, such as mullite crystals.

Other methods may be used to treat the leached and surface treated glass fibers for use in the mounting mat in order to further improve and maintain a minimum holding pressure for holding the fragile structure within the housing for example, an ion exchange process or a diffusion process to increase the creep resistance of the fibers. However, it will be understood that essentially any method by which one can treat the leached glass fibers or the mounting mat so as to further improve and maintain a minimum holding pressure for the mat for holding the fragile structure within the housing after thermal cycling, may be used.

The mounting mat preferably employs up to 100 percent by weight of the leached and surface treated glass fibers containing silica. However, in other embodiments, the mat may optionally comprise other known fibers such as alumina/silica fibers, or other ceramic or glass fibers suitable for use in the production of mounting mats for the particular temperature applications desired. Thus, alumina/silica fibers such as refractory ceramic fibers may be optionally employed for high temperature or wide ranging temperature applications. Other ceramic or glass fibers such as S-glass may be used with the leached glass silica fibers in similar or lower temperature applications. In such instances, however, the mounting mat preferably includes at least 50 percent by weight of leached and surface treated glass fibers containing silica. In other words, the majority of the fiber utilized in the production of the mat will be leached and surface treated glass fibers containing silica, and in certain embodiments, at least 80 percent by weight of the fibers will be leached and surface treated glass fibers containing silica.

In certain alternative embodiments, fibers such as S2-glass and the like may be added to the mounting mat in quantities of from greater than 0 to about 50 percent by weight, based upon 100 percent by weight of the total mat. It is envisioned that these glass fibers will be used mainly in low temperature applications due to their melting temperatures and the like.

In other alternative embodiments, the mounting mat may include refractory ceramic fibers in addition to the leached glass fibers. When refractory ceramic fibers, that is, alumina/silica fibers or the like are utilized, they may be present in an amount ranging from greater than 0 to less than about 50 percent by weight, based upon 100 percent by weight of the total mat.

As noted previously, the mounting mats may or may not include a binder. When a binder is used, the components are mixed to form a mixture or slurry. The slurry of fibers and binder is then formed into a mat structure and the binder is removed, thereby providing a mounting mat containing substantially only the heat-treated fibers (and optionally additional fibers). Typically, a sacrificial binder is employed to initially bond the fibers together. The binders used are typically organic binders. By "sacrificial," it is meant that the binder will eventually be burned out of the mounting mat, leaving only the leached glass fibers (and other ceramic or glass fibers, if used) as the mounting mat for supporting the fragile structure.

Suitable binders include aqueous and nonaqueous binders, but preferably the binder utilized is a reactive, thermally setting latex, which after cure is a flexible material that can be burned out of an installed mounting mat as indicated above. Examples of suitable binders or resins include, but are not limited to, aqueous based latexes of acrylics, styrene-butadiene, vinylpyridine, acrylonitrile, vinyl chloride, polyurethane and the like. Other resins include low temperature, flexible thermosetting resins such as unsaturated polyesters, epoxy resins and polyvinyl esters. Preferably, about 5 to about 10 percent latex is employed, with about 8 percent being most preferred. Solvents for the binders can include water, or a suitable organic solvent, such as acetone, for the binder utilized. Solution strength of the binder in the solvent (if used) can be determined by conventional methods based on the binder loading desired and the workability of the binder system (viscosity, solids content, etc.).

Instead of binder, the mat may include other fibers in addition to the leached glass fibers to hold the mat together. Such fibers are known in the art as binder fibers. These fibers may be used in amounts ranging from greater than 0 to about 20 percent by weight, based upon 100 percent by weight of the total composition, to aid in binding the leached glass fibers together.

The mounting mat containing the leached and surface treated silica containing fibers can be prepared by any known techniques commonly used in the preparation of mounting mats. For instance, using a papermaking process, the leached and surface to treated glass fibers may be mixed with a binder or other fibers capable of acting as a binder to form a mixture or slurry. Any mixing means may be used, but preferably, when a binder is used, the fibrous components are mixed at about a 0.25% to 5% consistency or solids content (0.25-5 parts solids to 99.75-95 parts water). The slurry may then be diluted with water to enhance formation, and it may finally be flocculated with a flocculating agent and drainage retention aid chemicals. Then, the flocculated mixture or slurry may be placed onto a papermaking machine to be formed into a ply of fiber containing paper. Alternatively, the plies may be formed by vacuum casting the slurry. In either case, they are typically dried in ovens. For a more detailed description of the standard papermaking techniques employed, see U.S. Pat. No. 3,458,329, the disclosure of which is incorporated herein by reference. It will be appreciated that when a binder is employed and the leached and surface treated glass fibers are to be heat treated, the step of heat treating the fibers should be performed prior to adding the binder or binding fibers to the leached glass fibers.

In other embodiments, the leached and surface treated glass fibers may be processed into a mat by conventional means such as dry air laying. The mat at this stage has very little structural integrity and is very thick relative to conventional catalytic converter and diesel trap mounting mats. The resultant mat can therefore be dry needled, as is commonly known in the art, to densify the mat and increase its strength. Heat treatment of the fibers may occur prior to formation of the mat or after the mat is needled.

Where the dry air layering technique is used, the mat may be alternatively processed by the addition of a binder to the mat by impregnation to form a discontinuous fiber composite. In this technique, the binder is added after formation of the mat, rather than forming the mat prepreg as noted hereinabove with respect to the conventional papermaking technique. This method of preparing the mat aids in maintaining fiber length by reducing breakage. It will be appreciated, however, that heat treatment may occur prior to addition of any binder.

Methods of impregnation of the mat with the binder include complete submersion of the mat in a liquid binder system, or alternatively spraying the mat. In a continuous procedure, a fiber mat which can be transported in roll form, is unwound and moved, such as on a conveyer or scrim, past spray nozzles which apply the binder to the mat. Alternatively, the mat can be gravity-fed past the spray nozzles. The mat/binder prepreg is then passed between press rolls, which remove excess liquid and densify the prepreg to approximately its desired thickness. The densified prepreg may then be passed through an oven to remove any remaining solvent and if necessary to partially cure the binder to form a composite. The drying and curing temperature is primarily dependent upon the binder and solvent (if any) used. The composite can then either be cut or rolled for storage or transportation.

The mounting mat can also be made in a batch mode, by immersing a section of the mat in a liquid binder, removing the prepreg and pressing to remove excess liquid, thereafter drying to form the composite and storing or cutting to size.

It is noted that mounting mats produced from these leached and surface treated glass fibers may be too low in density for easy use in certain catalytic converter applications. Therefore, they may undergo further densification by any manner known in the art to provide a higher density. One such manner of densification is to needle punch the fibers so as to intertwine and entangle them. Additionally or alternatively, hydroentangling methods may be used. Another alternative is to press the fibers into a mat form by rolling them through press rollers. Any of these methods of densification of the mats or a combination of these methods can be readily used to obtain a mounting mat of the correct and desired form.

Regardless of which of the above-described techniques are employed, the composite can be cut, such as by die stamping, to form mounting mats of exact shapes and sizes with reproducible tolerances. The mounting mat 20 exhibits suitable handling properties upon densification as by needling or the like, meaning it can be easily handled and is not so brittle as to crumble in one's hand like many other fiber blankets or mats. It can be easily and flexibly fitted or wrapped around the catalyst support structure 18 or like fragile structure without cracking, and then disposed within the catalytic converter housing 12. Generally, the mounting mat-wrapped fragile structure can be inserted into a housing or the housing can be built or otherwise fabricated around the mounting mat-wrapped fragile structure.

The mounting mat is capable of maintaining a minimum holding pressure of at least 50 kPa after undergoing 1000 mechanical cycles of a standard 1000 cycle gap expansion test conducted at a hot face temperature of about 300° C., with a mat gap bulk density of from about 0.3 to about 0.5 g/cm$^3$, and a percent gap expansion of about 2 percent. It will be appreciated that this test is particularly suited for mounting mats to be used in holding heavier substrates in high G load applications in low temperature applications. Exhaust gas treatment devices for such applications include diesel catalyst structures and diesel particulate traps. For high temperature applications, such as are common for catalytic converters, the mounting mat has been found to be capable of maintaining a minimum holding pressure of at least 10 kPa after undergoing 1000 mechanical cycles of a standard 1000 cycle gap expansion test conducted at a hot face temperature of about 900° C., with a mat gap bulk density of from about 0.3 to about 0.5 g/cm$^3$, and a percent gap expansion of about 5 percent.

By the term "cycle" it is meant that the gap between the monolith (i.e., fragile structure) and housing is opened and closed over a specific distance and at a predetermined rate. In order to simulate realistic conditions, the expansion of the gap between a housing and a fragile structure of a given diameter may be determined by calculating the coefficient of thermal expansion of a conventional housing at a temperature of, for example, about 900° C. A final mat basis weight is then selected that will meet the criteria of the test, and provide a minimum holding force (Pmin) of greater than about 10 kPa after 1000 cycles. The goal is to provide adequate support at the lowest cost, so the minimum basis weight that satisfies the greater than about 10 kPa requirement is selected. While certain prior art non-intumescent mounting mats may also have the capability of maintaining a "high" minimum pressure after 1000 cycles at a hot face temperature of at least about 900° C., those mats uniformly contain very expensive, sol gel derived ceramic fibers having a high alumina content of at least 30 percent or higher, or crystalline quartz derived fibers, or both.

In operation, the catalytic converter experiences a significant change in temperature. Due to the differences in their thermal expansion coefficients, the housing may expand more than the support structure 18, such that the gap between these elements will increase slightly. In a typical case, the gap may expand and contract on the order of about 0.25 to about 0.5 mm during thermal cycling of the converter. The thickness and mounting density of the mounting mat is selected such that a minimum holding pressure of at least about 10 kPa is maintained under all conditions to prevent the fragile structure from vibrating loose. The mounting pressure exerted by the mounting mat 20 under these conditions permits accommodation of the thermal characteristics of the assembly without compromising the physical integrity of the constituent elements.

For mounting mats to be used in lower temperature applications, testing is conducted at about 300° C. However, the testing is conducted in the same manner as the high temperature test described. However, given the differences in load applications and the fact that heavier catalyst structures are often used, the minimum holding pressure must be higher. Therefore, as noted above, the mat must provide a holding pressure against the fragile structure of at least 50 kPa after 1000 cycles of testing at a hot face temperature of about 300° C.

EXPERIMENTAL

The following examples are set forth merely to further illustrate the effect of the treatment of the exterior surfaces of inorganic fibers with colloidal dispersions of inorganic oxide material. The illustrative examples should not be construed as limiting the mounting mat, exhaust gas treatment device incorporating the mounting mat, or the methods of making the mounting mat or the exhaust gas treatment device in any manner.

Four fiber mat samples were tested for the effect of the addition of colloidal alumina on the exterior surfaces of the silica fibers of the mat on the holding pressure performance.

Example C1

Example No. C1 was a fiber mat containing leached and heat treated glass fibers having a high silica content. The fiber mat was prepared by a wet forming process. Briefly, a slurry containing leached glass fibers high in silica content and which were heat treated at a temperature of about 1100° C. for about 2 hours, binder, and water was prepared. The water was removed from the slurry thereby forming a mat structure. A 2 inch by 2 inch sample was cut from the fiber mat. The fiber mat sample was positioned between two heaters at a gap bulk density of 0.35. One heater was taken to a temperature of 900° C. to simulate operating temperatures of a vehicle catalytic converter. As the temperature was elevated to 900° C., the holding pressures of the fiber mat were recorded.

Example C2

Example No. C2 was a fiber mat containing leached and heat treated silica fibers, and was prepared in accordance with Example C1. A 2 inch by 2 inch sample was cut from the fiber mat. The 2 inch by 2 inch fiber mat sample was then placed between layers of an organic scrim material. The fiber mat sample having an organic scrim on each surface was positioned between two heaters at a gap bulk density of 0.35. One heater was taken to a temperature of 900° C. to simulate operating temperatures of a vehicle catalytic converter. As the temperature was elevated to 900° C., the holding pressures of the fiber mat were recorded.

Example 3

Example No. 3 was a fiber mat containing leached and heat treated silica fibers. A slurry containing the leached glass fibers, colloidal alumina, and water was prepared. The pH of the mixture was adjusted by the addition of NaOH, which caused the colloidal alumina to precipitate onto the surfaces of the leached glass fibers. The water was removed from the slurry thereby forming a loose mat structure. The mat structure was then dried. Following drying, the mat was heat treated at a temperature of about 1100° C. for about 2 hours. The heat treated loose fiber mat was redispersed in a slurry with organic binder and water. The water was removed from the slurry, thereby forming a mat structure. The mat structure was then dried. The colloidal alumina was precipitated on the exterior surfaces of the fibers at 4 weight percent, based on the weight of the silica fiber mat.

A 2 inch by 2 inch sample was cut from the fiber mat and was then placed between layers of an organic scrim material. The fiber mat sample having an organic scrim on each surface was positioned between two heaters at a gap bulk density of 0.35. One heater was taken to a temperature of 900° C. to simulate operating temperatures of a vehicle catalytic converter. As the temperature was elevated to 900° C., the holding pressures of the fiber mat were recorded.

Example 4

Example No. 4 was a fiber mat containing leached and heat treated silica fibers prepared in accordance with Example 3, except that the colloidal alumina was precipitated on the exterior surfaces of the fibers at 10 weight percent, based on the weight of the silica fiber mat. A 2 inch by 2 inch sample was cut from the fiber mat and was placed between layers of an organic scrim material. The fiber mat sample having an organic scrim on each surface was positioned between two heaters at a gap bulk density of 0.35. One heater was taken to a temperature of 900° C. to simulate operating temperatures of a vehicle catalytic converter. As the temperature was elevated to 900° C., the holding pressures of the fiber mat were recorded.

The holding pressure data for the fiber mat is reported in Table I below.

TABLE 1

| Temperature (° C.) | Pressure (kPa) | | | |
| --- | --- | --- | --- | --- |
| | C1 | C2 | 3 | 4 |
| 65 | 265 | 300 | 362 | 379 |
| 100 | 246 | 254 | 308 | 378 |
| 150 | 205 | 202 | 262 | 338 |
| 200 | 190 | 177 | 243 | 299 |
| 250 | 160 | 133 | 206 | 281 |
| 300 | 111 | 101 | 178 | 246 |
| 350 | 94 | 91 | 169 | 216 |
| 400 | 88 | 84 | 161 | 202 |
| 450 | 86 | 80 | 157 | 193 |
| 500 | 85 | 73 | 136 | 182 |
| 550 | 83 | 70 | 131 | 172 |
| 600 | 83 | 69 | 127 | 170 |
| 650 | 82 | 68 | 124 | 168 |
| 700 | 85 | 69 | 125 | 168 |
| 750 | 87 | 70 | 126 | 168 |
| 800 | 88 | 70 | 128 | 169 |

TABLE 1-continued

| Temperature (° C.) | Pressure (kPa) | | | |
|---|---|---|---|---|
| | C1 | C2 | 3 | 4 |
| 850 | 88 | 70 | 129 | 169 |
| 900 | 90 | 69 | 130 | 169 |
| % Loss | 66% | 77% | 64% | 55% |

Upon heating the silica fiber mat of Example No. C1 through a temperature range of 65° C. to 900° C., the holding pressure of the mat decreased from 265 kPa to 90 kpa. Thus, a silica fiber mat without a treatment of colloidal alumina exhibited a loss in holding pressure for a fragile monolith of about 66%.

Upon heating the silica fiber mat of Example No. C2 through a temperature range of 65° C. to 900° C., the holding pressure of the mat decreased from 300 kPa to 69 kpa. Thus, a silica fiber mat without an alumina addition exhibited a loss in holding pressure for a fragile monolith of about 77%. These results indicate that attaching an organic scrim layer to a surface of a silica fiber mat further increases the loss in holding pressure performance of the silica fiber mat, thus reducing the holding pressure performance of the mat.

Upon heating the silica fiber mat of Example No. 3 through a temperature range of 65° C. to 900° C., the holding pressure of the mat only decreased from 362 kPa to 130 kPa. Thus, a silica fiber mat with a 4% addition of colloidal alumina to the exterior surfaces of the silica fiber exhibits an improvement in holding pressure performance over a silica fiber mat without an addition of colloidal alumina.

Upon heating the silica fiber mat of Example No. 4 through a temperature range of 65° C. to 900° C., the holding pressure of the mat only decreased from 379 kPa to 170 kpa. Thus, a silica fiber mat with 10% alumina addition only exhibited a loss in holding pressure for a fragile monolith of about 55%. This is a significant improvement in holding pressure performance as compared to a silica fiber mat without an addition of colloidal alumina.

Example 5

A mounting mat for an exhaust gas treatment device was prepared from leached glass fibers high in silica content by a wet forming process. A slurry containing the leached glass fibers, binder, and water was prepared. The water was removed from the slurry thereby forming a mat structure. The mat structure was then dried. Following drying, the mat was heat treated at a temperature of about 1100° C. for about 2 hours. The heat treated mat was wrapped around a portion of a fragile ceramic monolith and the wrapped monolith was inserted into a steel housing, thereby forming a catalytic converter.

The catalytic converter was exposed to a temperature of about 700° C. for about 2 hours, followed by exposure to a temperature of about 500° C. for about 6.5 hours, followed by exposure to a temperature of about 750° C. for about 6.5 hours. After exposure of the catalytic converter to the above conditions, the monolith was pushed out of the catalytic converter housing by a mechanical ram. The force required to push the monolith out of the catalytic converter housing was 204N.

Example 6

A mounting mat for an exhaust gas treatment device was prepared from leached glass fibers high in silica content by a wet forming process. A slurry containing the leached glass fibers, colloidal alumina, and water was prepared. The pH of the mixture was adjusted by the addition of NaOH, which caused the colloidal alumina to precipitate onto the surfaces of the leached glass fibers. The water was removed from the slurry, thereby forming a loose mat structure. The mat structure was then dried. Following drying, the mat was heat treated at a temperature of about 1100° C. for about 2 hours. The heat treated loose mat was redispersed in water and binder to form a slurry. The water was removed from the slurry thereby, forming a mat structure. The mat structure was then dried.

The mat was wrapped around a portion of a fragile ceramic monolith and the wrapped monolith was inserted into a steel housing, thereby forming a catalytic converter. The catalytic converter was exposed to a temperature of about 700° C. for about 2 hours, followed by exposure to a temperature of about 500° C. for about 6.5 hours, followed by exposure to a temperature of about 750° C. for about 6.5 hours. After exposure of the catalytic converter to the above conditions, the monolith was pushed out of the catalytic converter housing by a mechanical ram. The force required to push the monolith out of the catalytic converter housing was 732N. Thus, the mounting mat of Example 6 provided an increased holding pressure for holding the fragile monolith such that there was nearly a 4 fold increase in the force required to push the monolith out of the housing of the catalytic converter.

Thus, it has been demonstrated that treating the exterior surfaces of leached glass fibers having a high silica content with a dispersion of colloidal inorganic oxides, such as a colloidal dispersion of alumina, results in a reduction in the loss of holding pressure performance of a mounting mat over a wide range of operating temperatures experienced in exhaust gas treatment devices.

The mounting mats can be die cut and are operable as resilient supports in a thin profile, providing ease of handling, and in a flexible form, so as to be able to provide a total wrap of the catalyst support structure, if desired, without cracking. Alternatively, the mounting mat may be integrally wrapped about the entire circumference or perimeter of at least a portion of the catalyst support structure. The mounting mat may also be partially wrapped and include an end-seal as currently used in some conventional converter devices, if desired, to prevent gas by-pass.

The mounting mats described above are also useful in a variety of applications such as conventional automotive catalytic converters for, among others, motorcycles and other small engine machines, and automotive preconverters, as well as high temperature spacers, gaskets, and even future generation automotive underbody catalytic converter systems. Generally, they can be used in any application requiring a mat or gasket to exert holding pressure at room temperature and, more importantly, to provide the ability to maintain the holding pressure at elevated temperatures of from about 20° C. to at least about 1100° C., including during thermal cycling.

The mounting mats described above can also be used in catalytic converters employed in the chemical industry which are located within exhaust or emission stacks, including those which contain fragile honeycomb type structures that need to be protectively mounted.

The present invention is not limited to the specific embodiments described above, but includes variations, modifications and equivalent embodiments defined by the following claims. The embodiments described above are not necessarily in the alternative, as various embodiments may be combined to provide the desired characteristics.

We claim:

1. A mounting mat comprising:
   heat treated inorganic fibers; and
   a holding pressure performance increasing surface treatment comprising an inorganic particulate on at least a portion of the exterior surfaces of at least a portion of the inorganic fibers, wherein said mounting mat has a minimum holding pressure for holding a fragile structure within a housing of at least one of (i) at least 50 kPa after 1000 cycles of testing at a hot face temperature of 300° C., a gap bulk density of between 0.3 and 0.5 g/cm$^3$, and a percent gap expansion of 2 percent, and (ii) at least 10 kPa after 1000 cycles of testing at a hot face temperature of 900° C., a gap bulk density of between 0.3 and 0.5 g/cm$^3$, and a percent gap expansion of 5 percent.

2. The mounting mat of claim 1, wherein said fibers are selected from alumina, alumino-silicate fibers, alumina/magnesia/silica fibers, calcia/magnesia/silica fibers, magnesia/silica fibers, S-glass fibers, E-glass fibers, quartz fibers, and silica fibers.

3. The mounting mat of claim 2, wherein said mounting mat comprises at least one integral, substantially non-expanding layer of melt-formed, leached glass fibers containing at least 67 percent by weight silica.

4. The mounting mat of claim 3, wherein said mounting mat comprises from about 50 to 100 percent by weight of said leached glass fibers.

5. The mounting mat of claim 4, wherein said mounting mat comprises at least about 80 percent by weight of said leached glass fibers.

6. The mounting mat of claim 3, wherein the mounting mat is substantially free of binder.

7. The mounting mat of claim 3, wherein the leached glass fibers have a diameter greater than about 3.5 microns.

8. The mounting mat of claim 1, wherein said holding pressure performance-increasing surface treatment comprises a coating.

9. The mounting mat of claim 1, wherein said inorganic particulate is selected from the group consisting of dispersions of colloidal alumina, colloidal silica, colloidal zirconia, or mixtures thereof.

10. The mounting mat of claim 9, wherein said inorganic particulate comprises a friction increasing agent.

* * * * *